United States Patent
Campbell et al.

[15] 3,676,507

[45] July 11, 1972

[54] STABILIZED TRICHLOROETHYLENE

[72] Inventors: Alastair Campbell; Peter Robinson, both of Runcorn, England

[73] Assignee: Imperial Chemical Industries Limited, London, England

[22] Filed: Feb. 20, 1970

[21] Appl. No.: 13,203

[30] Foreign Application Priority Data

March 24, 1969 Great Britain ..................... 15,306/69

[52] U.S. Cl. ..................... 260/652.5 R, 252/170, 252/171, 252/403
[51] Int. Cl. ..................... C07c 17/40, C07c 17/42
[58] Field of Search ................. 260/652.5; 252/170, 171, 403

[56] References Cited

UNITED STATES PATENTS

| | | | |
|---|---|---|---|
| 3,000,977 | 9/1961 | Patron et al. | 260/652.5 |
| 2,751,421 | 6/1956 | Stauffer | 260/652.5 |
| 3,293,312 | 1/1966 | Ryckaert et al. | 260/652.5 |
| 2,008,680 | 7/1935 | Carlisle et al. | 260/652.5 |
| 3,076,040 | 1/1963 | Skeeters | 260/652.5 |
| 3,539,646 | 11/1970 | Dannels et al. | 260/652.5 X |
| 2,947,792 | 8/1960 | Skeeters | 260/652.5 |
| 3,230,175 | 1/1966 | Martens | 260/652.5 |
| 2,981,760 | 4/1961 | Ferric et al. | 260/652.5 |
| 3,326,989 | 6/1967 | Cormany et al. | 260/652.5 |

FOREIGN PATENTS OR APPLICATIONS

| | | | |
|---|---|---|---|
| 422,406 | 3/1965 | Japan | 260/652.5 |
| 1,083,698 | 9/1967 | Great Britain | 260/652.5 |

*Primary Examiner*—Howard T. Mars
*Attorney*—Cushman, Darby & Cushman

[57] ABSTRACT

A phenol which carries at least one substituent in an ortho position with respect to a hydroxy-group and phenol itself or a substituted phenol which carries no substituent in an ortho position with respect to a hydroxy-group are used as synergistically co-operative inhibitors of oxidation of trichloroethylene.

3 Claims, No Drawings

STABILIZED TRICHLOROETHYLENE

The present invention relates to stabilized trichloroethylene. More particularly it relates to a method of inhibiting oxidative decomposition of trichloroethylene.

It is known that trichloroethylene tends to decompose by atmospheric oxidation with the progressive formation of acidic products, particularly under the influence of heat and light. It is also known that in the presence of reactive metals, notably aluminum, the solvent can undergo a self-condensation reaction, leading to rapid discoloration and ultimately the formation of tarry material and copious amounts of acid products. When the solvent is employed for the treatment of textile fibers and fabrics, as for instance in scouring and desizing operations during textile manufacture and in dry-cleaning of finished textiles, metal-catalyzed decomposition is not usually a problem but long-term protection against oxidative degradation of the solvent is essential, particularly since the solvent used in these processes must be repeatedly recovered for re-use.

It is known to suppress oxidative deterioration of trichloroethylene by adding an inhibitor to the solvent, particularly a phenolic compound, for instance phenol itself, o-cresol, thymol, p-tert.-butyl phenol, p-tert.-amyl phenol or isoeugenol. When the stabilized solvent is used for the treatment of textile materials it is desirable to keep the concentration of phenolic additives as low as possible because residual odor can be imparted to the textile material by phenols adsorbed thereon from the solvent. We have now found that a synergistic antioxidant effect can be obtained by adding to trichloroethylene a phenolic compound from each of two distinct classes of phenolic compounds. By working in this way an equivalent antioxidant effect can be obtained with a smaller total concentration of phenolic compounds than using one phenolic compound alone, or alternatively a higher degree of resistance to oxidation can be achieved with the same total concentration of phenolic compounds.

According to the present invention, therefore, we provide a stabilized trichloroethylene composition which comprises trichloroethylene and as synergistically co-operative inhibitors of oxidation thereof a substituted phenol which carries at least one substituent in an ortho position with respect to a hydroxy-group and phenol itself or a substituted phenol which carries no substituent in an ortho position with respect to a hydroxy-group the amount of each of the said phenols being in the range 0.002–1.0 percent by weight of the trichloroethylene.

In each class of substituted phenols as defined in the preceding paragraph the substituent atoms or groups may be any of chloro, nitro, alkoxy, hydroxy, amino, alkylamino, keto, alkanoyl, alkyl, alkenyl, aryl, and substituted alkyl, alkenyl and aryl wherein the substituents are any of chloro, nitro, alkoxy, hydroxy, amino, alkylamino, keto and alkanoyl. So that the inhibitors will vaporize readily with the trichloroethylene during distillation of the solvent it is preferred that the substituents be small. It is also preferred that the inhibitors should have a low solubility in water so that they remain substantially in the solvent phase when the solvent has been recovered by steam distillation after use. Most preferably the phenols employed contain not more than one substituent in the benzene ring in addition to the parent hydroxy-group, since such phenols are more readily recovered along with the solvent during steam distillation. Suitably the substituents are straight-chain or branched-chain alkyl and/or alkoxy radicals containing not more than five carbon atoms each, but this is not essential.

In general we prefer to employ approximately equal parts by weight of each of the said two classes of phenolic compound. Proportions of each class of phenolic compound in the range 0.01–0.1 percent, calculated on the weight of the trichloroethylene, are most suitable.

If desired, within the scope of the invention, other materials known to exert an antioxidant effect in trichloroethylene may also be incorporated in the stabilized solvent, for instance one or more of alkyl butenes, alkyl butadienes, amines, pyrrole, substituted pyrroles, hydrazines, hydrazones and oximes. Suitable amounts of any of these materials are for example 0.0005–2 percent by weight. An acid acceptor such as an epoxide, particularly the butene oxides and/or epichlorhydrin, may also be included in the stabilized solvent. Suitable amounts of epoxide are for example 0.1–1 percent by weight. Furthermore, if it is desired also to give the solvent extra protection against decomposition in the presence of reactive metals such as aluminum, one or more of the known inhibitors of this type of decomposition may be included, for instance one or more of alcohols, ketones, carboxylic esters, nitroalkanes, alkyl and alkoxy esters of nitric acid, alkyl and aralkyl ethers, and cyclic ethers containing more than two carbon atoms in the ring. Suitable amounts of any of these materials are for example 0.1–2 percent by weight.

The invention is further illustrated by the following comparative examples in which the effect of incorporating a single phenol in trichloroethylene is compared with the effect of incorporating two phenols in accordance with the invention at the same total phenol concentration in preventing oxidation of the solvent in the presence of heat and light. The tests were also conducted in the presence of iron powder since solvent used only for the treatment of textile materials and other applications where contact with aluminum and very reactive aluminum alloys is not a problem is nevertheless likely to come into contact with iron in the structural members of the treatment plant. All percentages are by weight calculated on the weight of the trichloroethylene.

EXAMPLES

One hundred and eighty ml of trichloroethylene with or without additions of phenols, as shown in the following table, and no other stabilizers were placed in a 500 ml conical flask together with 1.5g of iron powder. The flask was placed on an electric hot-plate with its vertical axis 4.5 inches from the center of an 80 watt Mazda mercury light bulb suspended vertically with its lower end 2 inches above the level of the top of the hop-plate. A soxhlet extractor surmounted by a double-surface condenser and modified to act as a water-separator and give a continuous feedback of refluxing solvent to the flask was fitted to the main neck of the flask and 20 ml of the same trichloroethylene sample as in the flask were placed in the soxhlet extractor and covered with 40 ml of distilled water, taking care to avoid any water entering the flask or the feedback arm. A dip-tube for the admission of oxygen to the liquid in the flask was fitted to a side neck.

A flow of oxygen (two bubbles/second) was passed through the solvent and the heat was switched on. When the solvent was refluxing at a steady rate the lamp was switched on and the test was continued for 18 hours. The lamp and heater were then switched off, the flask was allowed to cool and the oxygen flow was stopped. The results of the tests were evaluated by measuring the total chloride ion formed by decomposition of the solvent. This was done by washing out the condenser with distilled water, adding the washings to the aqueous layer separated from the contents of the soxhlet extractor and titrating the total aqueous phase for chloride ion, then combining the solvent layer from the soxhlet extractor with the solvent in the flask and determining the total chloride ion in the solvent phase by titrating 50 ml of the solvent phase while stirring vigorously with 200 ml of distilled water. The results of the two titrations were combined, a blank figure for any chloride ion found in the distilled water used being subtracted. The results shown in the following table demonstrate the synergistic effect of employing two classes of phenolic compound together as inhibitors in accordance with the invention.

| Inhibitors | Inhibitor Concentration % w/w | Chloride Ion Produced mg |
|---|---|---|
| None | – | 625 |
| o-cresol | 0.02 | 12.1 |
| p-cresol | 0.02 | 9.6 |
| 2,4-dimethyl-6-tert.-butyl phenol | 0.02 | 24.9 |

| | | |
|---|---|---|
| p-methoxy phenol | 0.02 | 14.9 |
| p-tert.-amyl phenol | 0.02 | 23.3 |
| o-cresol + p-cresol | 0.01 + 0.01 | 7.0 |
| o-cresol + p-methoxy phenol | 0.01 + 0.01 | 3.9 |
| o-cresol + p-tert.-amyl phenol | 0.01 + 0.01 | 4.1 |
| 2,4-dimethyl-6-tert.-butyl phenol + p-cresol | 0.01 + 0.01 | 5.7 |
| 2,4-dimethyl-6-tert.-butyl phenol + p-methoxy phenol | 0.01 + 0.01 | 6.0 |
| 2,4-dimethyl-6-tert.-butyl phenol + p-tert.-amyl phenol | 0.01 + 0.01 | 7.7 |

What we claim is:

1. A stabilized trichloroethylene composition consisting essentially of trichloroethylene and as synergistically co-operative inhibitors of oxidation a combination of phenols which consists essentially of monosubstituted monohydroxy phenol which carries only one substituent in an ortho position with respect to the hydroxy-group and phenol itself or monosubstituted monohydroxy phenol which carries only one substituent in other than the ortho position with respect to the hydroxy-group, wherein the substituents of the substituted phenols are alkyl and/or alkoxy radicals containing not more than five carbon atoms each, the amount of each of the said phenols being in the range 0.002–1.0 percent by weight of the trichloroethylene.

2. A composition according to claim 1, wherein the amount of each of the said phenols is in the range 0.01–0.1 percent by weight of the trichloroethylene.

3. A composition according to claim 1, wherein the amounts of each of the said phenols are approximately equal.

* * * * *